United States Patent [19]

Iida et al.

[11] Patent Number: 5,572,656
[45] Date of Patent: Nov. 5, 1996

[54] PORTRAIT DRAWING APPARATUS HAVING IMAGE DATA INPUT FUNCTION

[75] Inventors: Katsumi Iida, Aichi-ken; Takeshi Kawaguchi, Konan; Kazuyo Kokubo, Aichi-ken; Noriko Kagami, Toyota; Michiyo Amano, Gifu; Yoshihisa Kayanaka, Nagoya, all of Japan

[73] Assignee: Brother Kogyo Kabushiki Kaisha, Nagoya, Japan

[21] Appl. No.: 434,329

[22] Filed: May 2, 1995

Related U.S. Application Data

[63] Continuation of Ser. No. 69,368, Jun. 1, 1993, abandoned.

[51] Int. Cl.$^6$ .................................................. G06F 15/00
[52] U.S. Cl. .......................... 395/788; 345/113; 345/189
[58] Field of Search ..................................... 395/162–166; 345/113, 119, 120, 189, 201

[56] References Cited

U.S. PATENT DOCUMENTS

| | | | |
|---|---|---|---|
| 4,926,344 | 5/1990 | Collins et al. | 395/62 |
| 5,111,409 | 5/1992 | Gasper et al. | 395/152 |
| 5,179,652 | 1/1993 | Rozmanith et al. | 395/155 |
| 5,212,769 | 5/1993 | Pong | 395/150 |

FOREIGN PATENT DOCUMENTS 4-208191  7/1992  Japan .

OTHER PUBLICATIONS

R. Curtis, S. Scarfone, "XFace an XTool Presenting Multivariate Data, & Crs Use with Software Metrics", ICCC '92, pp. 525–530.

A. Levi et al. "A New Approach to Face Composites Construction Superposition of Whole Face Images", IEE, pp. 3/1–3/4.

S. Morishima et al. "Image Synthesis & Editing System for A Multi–Media Human Interface with Speaking Head" IIPA, 1992 pp. 270–273.

S. Morishima et al., "A Facial Image Synthesis System for Human–Machine Interface", IEEE, 1992 pp. 363–368.

"New Land KL-1200" (Owner's Manual) manufactured by CASIO, Oct. 1992.

*Primary Examiner*—Kee M. Tung
*Assistant Examiner*—U. Chauhan
*Attorney, Agent, or Firm*—Oliff & Berridge

[57] ABSTRACT

A portrait drawing apparatus having image data input function for allowing the operator to select candidates of facial parts while displaying a draft image of the model to be drawn on the display screen. Comparing the candidates with the draft image makes it easy to select the most appropriate candidate of each facial part as well as to position the selected candidate where appropriate. The apparatus comprises a memory unit for storing facial part candidates with which to construct a portrait, a draft image reader for reading image data from image-bearing materials, a display unit for superimposing the draft image onto facial part candidates, and a selector for selecting the most appropriate candidate of each facial part.

21 Claims, 5 Drawing Sheets

PORTRAIT DRAWING APPARATUS HAVING IMAGE DATA INPUT FUNCTION

This is a continuation of application Ser. No. 08/069,368, filed Jun. 1, 1993, now abandoned.

BACKGROUND OF THE INVENTION

1. Field of the Invention

The present invention relates to a portrait drawing apparatus and, more particularly, to a portrait drawing apparatus allowing novices to draw portraits easily and as desired.

2. Description of the Related Art

One of the common ways to draw portraits is by making use of a certain kind of data processing apparatus known as the portrait drawing apparatus. The portrait drawing apparatus comprises a display unit including a CRT or the like, an input unit through which to enter data, and various controllers. The display unit has on its screen a facial part display area and a portrait drawing area. The facial part display area displays such facial parts as the eyes, nose, mouth, eyebrows, ears, hair, facial contour, mustache, wrinkles and sideburns with which to construct a likeness. The portrait drawing area is an area in which the operator draws a portrait using the facial parts shown in the facial part display area.

To draw a portrait, the operator selects one of the candidates of each facial part displayed in the facial part display area, the selected part best representing the characteristic of the model's facial part in question. The selected facial parts are positioned successively where appropriate in the portrait drawing area until the portrait is completed.

How a portrait is drawn using a conventional portrait drawing apparatus will now be described with reference to the flowchart of FIG. 4. As indicated in FIG. 4, the operator first selects the facial part to be drawn (step F1). With the facial part selected, a collection of candidates of that part is displayed in the facial part display area (step F2). Suppose that the facial part "nose" is selected. The operator then selects the candidate that best represents the characteristic of the model's nose. When the most appropriate facial part candidate is selected, that part is positioned automatically where appropriate in the portrait drawing area (step F3). Automatic positioning of facial parts is implemented both to facilitate the drawing work and to take advantage of the fact that each facial part has its approximately fixed position in the human face (e.g., nose is at the center of the face).

With the nose selected and positioned, a check is made to see if there remain other facial parts to be selected (step F4). In this case, other facial parts need to be selected and positioned and thus step F1 is reached again. In step F1, candidates of the next facial part "eyes" are displayed and examined for selection. In like manner, the other facial parts (mouth, eyebrows, etc.) are selected and positioned. When all facial parts have been dealt with (YES in step F4), the portrait is completed.

One disadvantage of the conventional portrait drawing apparatus is this: it is quite difficult to fully grasp the model's physical features in advance and to select accordingly the best-fit facial parts from among the previously stored facial part candidates. It requires the operator to have experience and artistic tastes.

Another disadvantage of the prior art portrait drawing apparatus is that it lacks flexibility. The apparatus is noted for its ability to allow novices to draw portraits of acceptable quality, letting them select desired facial parts that are positioned automatically into a likeness. However, the prior art portrait drawing apparatus is incapable of accommodating specific requests such as one calling for dislodging a certain facial part a little in a given direction, despite the fact that doing so would improve the quality of the portrait appreciably.

If individual facial parts are allowed to be positioned where desired by the operator, the flexibility of the portrait drawing apparatus increases but the operator has difficulty determining the exact facial part positions. Positioning the facial parts where appropriate is especially difficult for operators unskilled in drawing portraits.

SUMMARY OF THE INVENTION

It is therefore an object of the present invention to overcome the above and other deficiencies and disadvantages of the prior art and to provide a portrait drawing apparatus allowing unskilled operators to position individual facial parts where desired with ease.

In carrying out the invention and according to one aspect thereof, there is provided a portrait drawing apparatus having an image data input function, comprising: an input unit for inputting image data about human faces taken from photographs and like materials; a display unit for displaying an image based on the image data; a memory unit for storing facial part data about such facial parts as the eyes and nose with which to draw a portrait; a selecting unit for selecting any of the facial part data held in the memory unit; and a display control unit for superimposing on the display unit the facial part selected by the selecting unit onto the human face input through the input unit.

In operation, a human face found in a photo or like material is read by the input unit (e.g., a scanner). The human face thus read is displayed on the display unit. A plurality of facial part candidates about each of the facial parts such as the eyes and nose are stored beforehand in the memory unit. When, say, the nose is to be selected, a collection of "nose" candidates are displayed on the display unit. From among the facial part candidates displayed, the operator selects the candidate that is considered to best represent the characteristic of the displayed human face. The selected candidate of the facial part "nose" is superimposed onto the human face on the display unit for simultaneous display. If the superimposed candidate is not quite right in comparison with the displayed face, the operator selects another candidate until the most appropriate candidate is determined. In like manner, other facial parts are determined successively.

These and other objects, features and advantages of the invention will become more apparent upon a reading of the following description and appended drawings.

DESCRIPTION OF THE PREFERRED EMBODIMENT

Figure 1A:
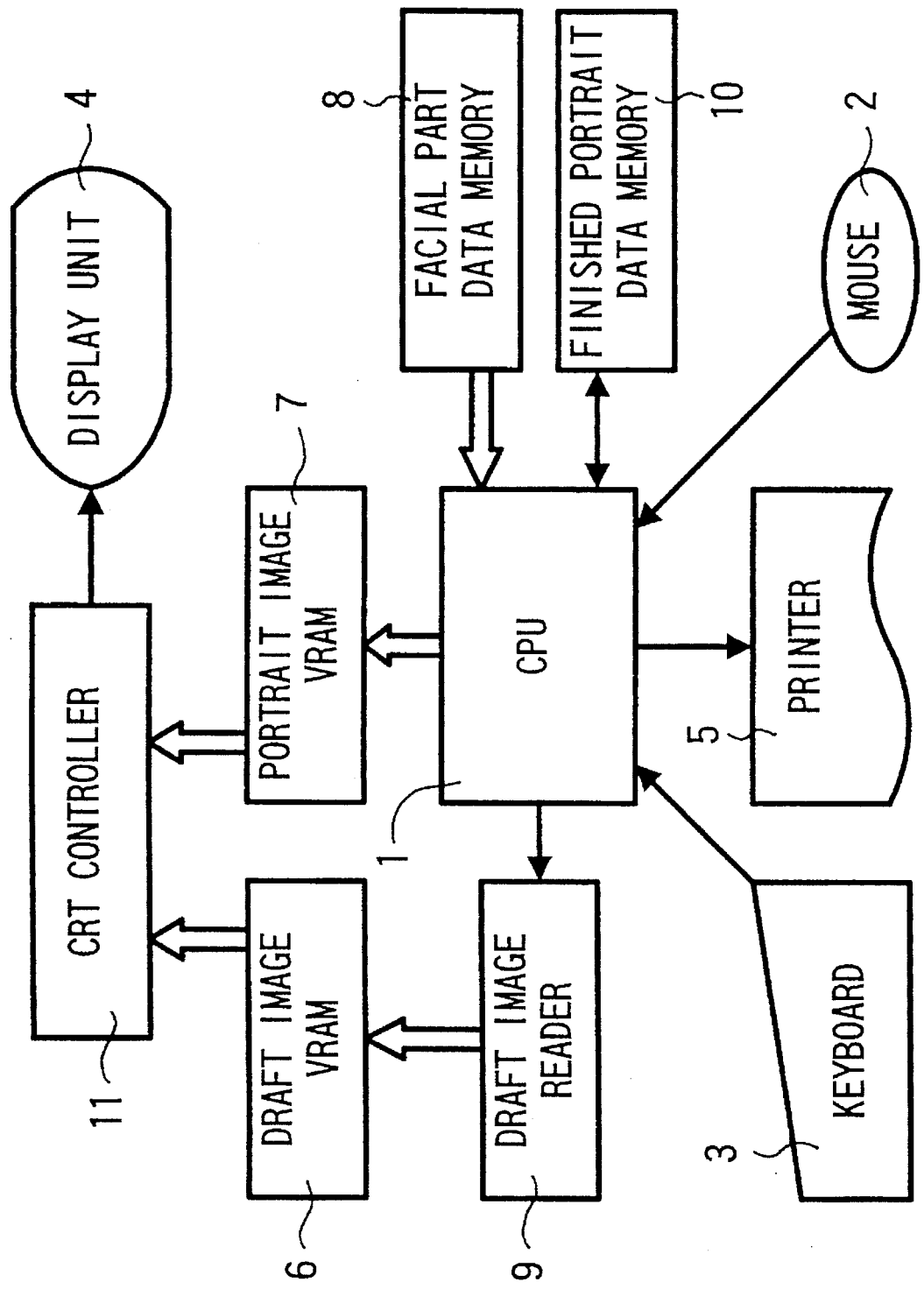
FIG. 1(A) is a block diagram of a portrait drawing apparatus embodying the invention.
Figure 1:
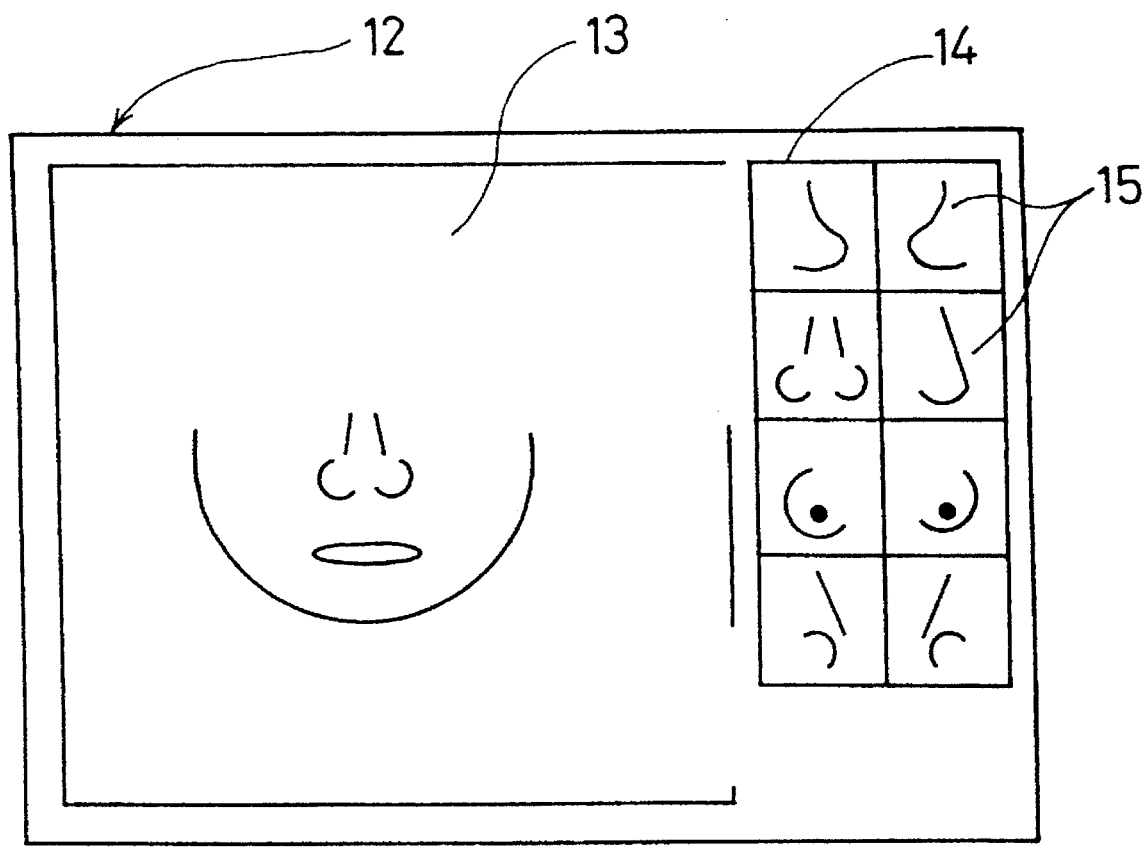
FIG. 1(B) is a view of a typical screen on the display unit of the embodiment.

One preferred embodiment of the invention will now be described with reference to the accompanying drawings. FIG. 1(A) is a block diagram of the portrait drawing apparatus practiced as the preferred embodiment of the invention. As shown in FIG. 1(A), a CPU 1 is connected to a mouse 2 and a keyboard 3 which are included in the input unit as well as to a printer 5 acting as an output unit. Two kinds of video RAM (VRAM) are provided: a draft image VRAM 6, and a portrait image VRAM 7. The memory unit comprises two kinds of RAM: a facial part data memory 8 and a finished portrait data memory 10. The input unit also includes a draft image reader 9 such as a scanner. The draft image VRAM 6 and portrait image VRAM 7 are both connected to a CRT controller 11 that controls the display operation of a display unit 4. The CRT controller 11 is capable of retrieving video data from the draft image VRAM 6 and portrait image VRAM 7 and combining these data for display on the display unit 4. The facial part data memory 8 stores beforehand candidates of such facial parts as the eyes, nose, ears, mouth, eyebrows and hair with which to construct a likeness.

FIG. 1(B) depicts a display screen 12 of the display unit 4 in effect when the portrait drawing apparatus is in operation. As illustrated, the display screen 12 comprises a facial part display area 14 and a portrait drawing area 13. The facial part display area 14 displays candidates of such facial parts as the eyes, nose, mouth, eyebrows, ears, hair, facial contour, mustache, wrinkles and sideburns. These facial part candidates are stored in the facial part data memory 8 and retrieved therefrom to construct a portrait. The portrait drawing area 13 is an area in which to draw the portrait using the facial part candidates. FIG. 1(B) shows a typical screen in which 8 candidates of the facial part "nose" are displayed.

Figure 2:
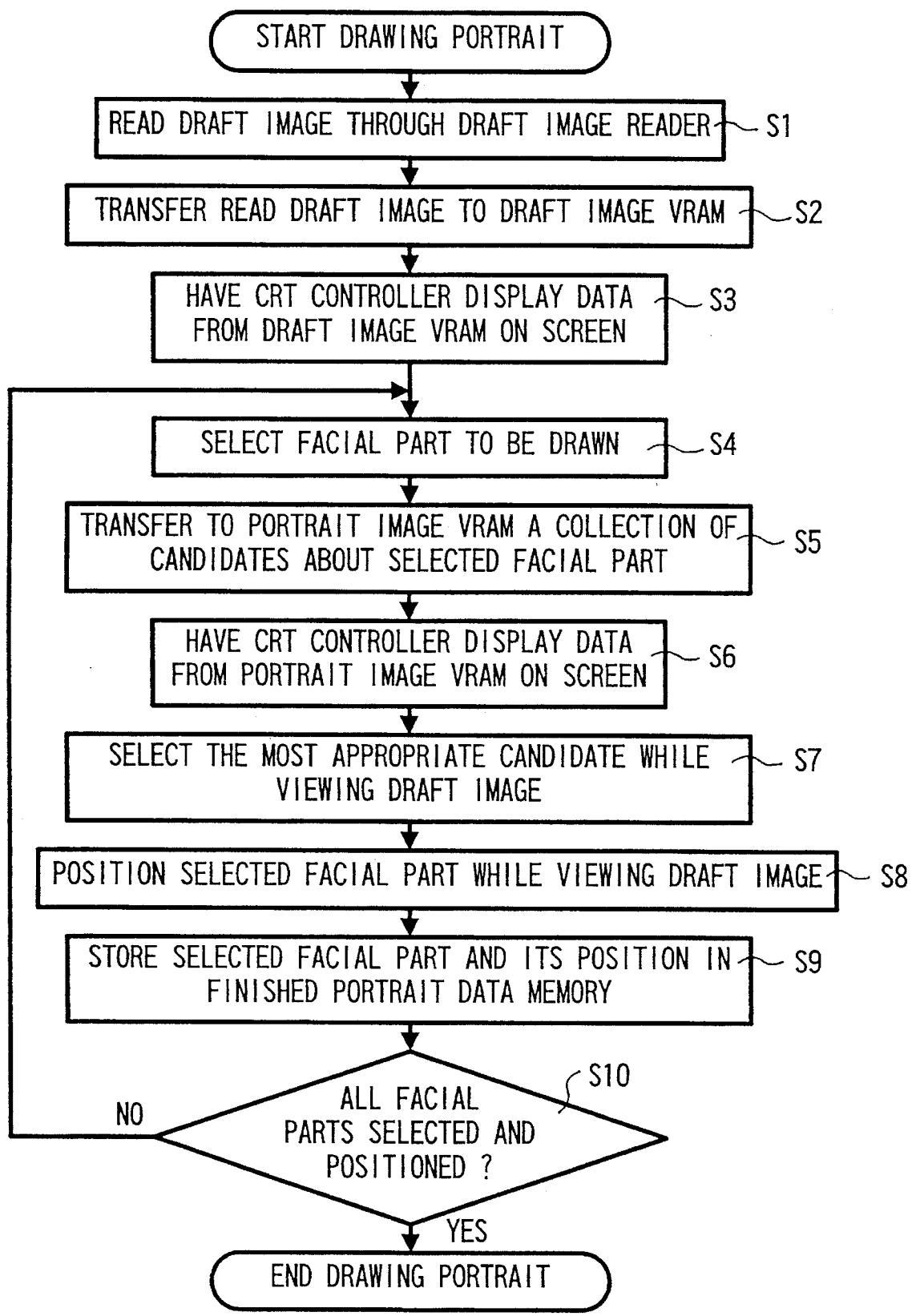
FIG. 2 is a flowchart of steps in which the embodiment works to draw a portrait.

How a portrait is drawn using the embodiment will now be described with reference to the flowchart of FIG. 2. First, draft image data about the model (i.e., person whose portrait is to be drawn) are read in by the draft image reader 9 such as a scanner from a photo or like material (step S1). The draft image data thus read are transferred by the CPU 1 to the draft image VRAM 6 (step S2). The transferred draft image data are displayed in the portrait drawing area 13 of the display screen 12 under control of the CRT controller 11 (step S3).

With the draft image of the model displayed on the display screen 12, the operator determines the facial part from which to start drawing the portrait (step S4). The CPU 1 reads the data on the selected facial part from the facial part data memory 8 and transfers the data to the portrait image VRAM 7 in the form of a collection of facial part candidates (step S5; 8 "nose" candidates in this example). The transferred collection of facial part candidates is displayed in the facial part display area 14 of the display screen 12 by the CRT controller 11 (step S6). That is, the display screen 12 displays simultaneously both the draft image derived from the photo or the like and the collection of candidates about the facial part in question.

On the display screen 12, the operator compares the draft image in the portrait drawing area 13 with the collection of facial part candidates in the facial part display area 14, and selects the most appropriate candidate by clicking the mouse 2 on it (step S7). Moving the mouse 2 across the screen controls the data in the portrait image VRAM 7 in such a way that the selected facial part candidate moves within the portrait drawing area 13 correspondingly.

Using the mouse 2, the operator superimposes the selected facial part candidate onto the draft image displayed in the portrait drawing area 13 for comparison (step S8). If the candidate is not deemed right, step S7 is repeated until the most appropriate candidate is found and selected. With the most appropriate facial part candidate selected, the optimum position of that part is determined (step S8).

With the facial part positioned properly, the data on that facial part are stored in the portrait image VRAM 7 while being displayed concurrently. The facial part candidate selected in step S7 and the position thereof determined in step S8 are stored in the finished portrait data memory 10 (step S9).

A check is made to see if all facial parts have been dealt with (step S10). If there are still facial parts to be selected and positioned, step S4 is reached again in which the next facial part to be drawn is selected. When all facial parts have been finished, the portrait is completed.

In the above manner, the candidates of such facial parts as the eyes, nose and mouth are selected successively and combined into the portrait. The finished portrait data are stored in the finished portrait data memory 10.

Because the photo or other draft image of the model remains displayed on the screen, each facial part (e.g., nose) is easy to position where appropriate. The ability of the embodiment to superimpose different candidates of the part onto the draft facial part allows the most appropriate candidate to be selected easily. Needless to say, the embodiment is capable of magnifying or contracting individual facial parts as desired.

Figure 3:
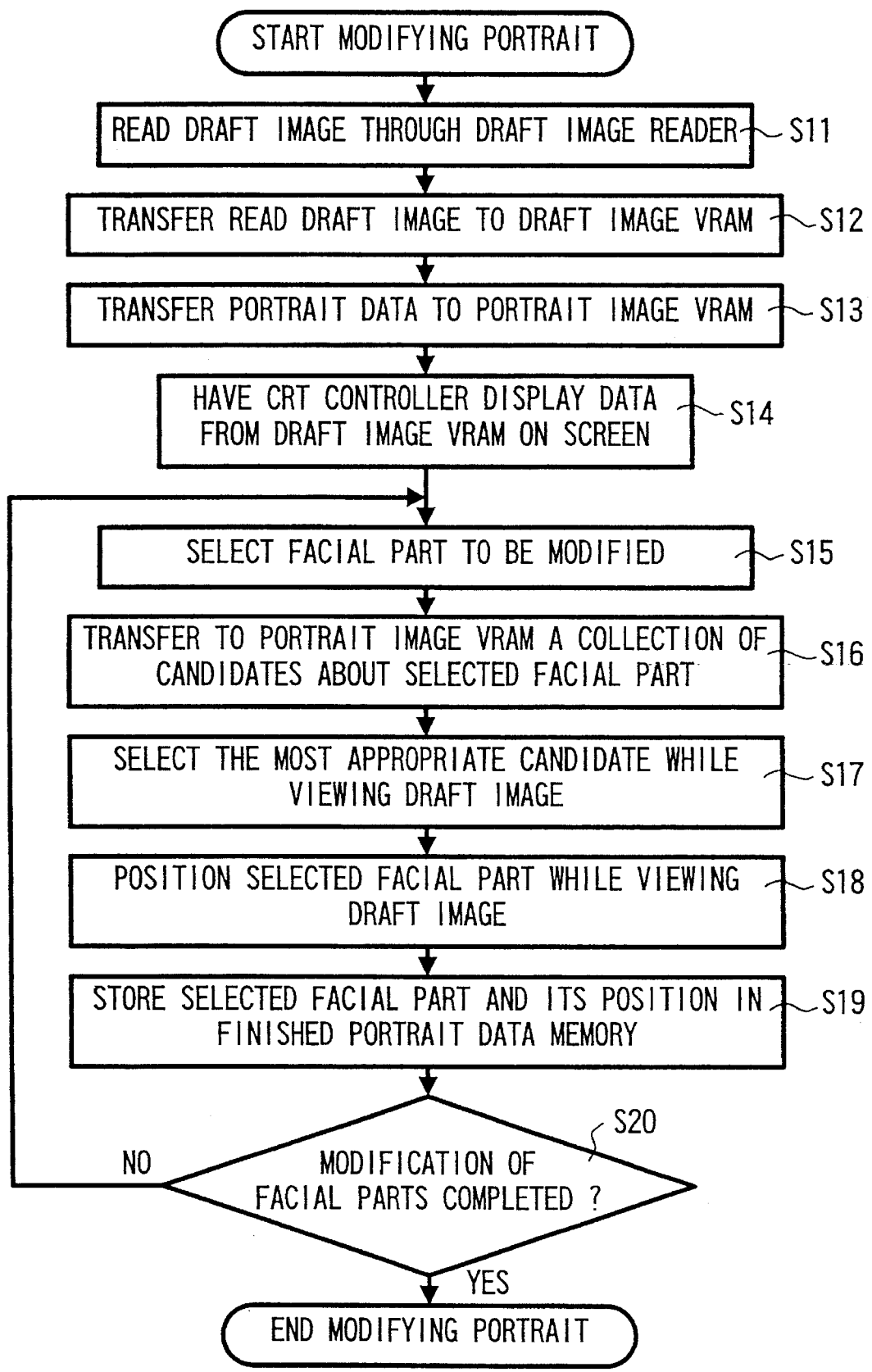
FIG. 3 is a flowchart of steps in which the embodiment works to modify a portrait.
Figure 4:
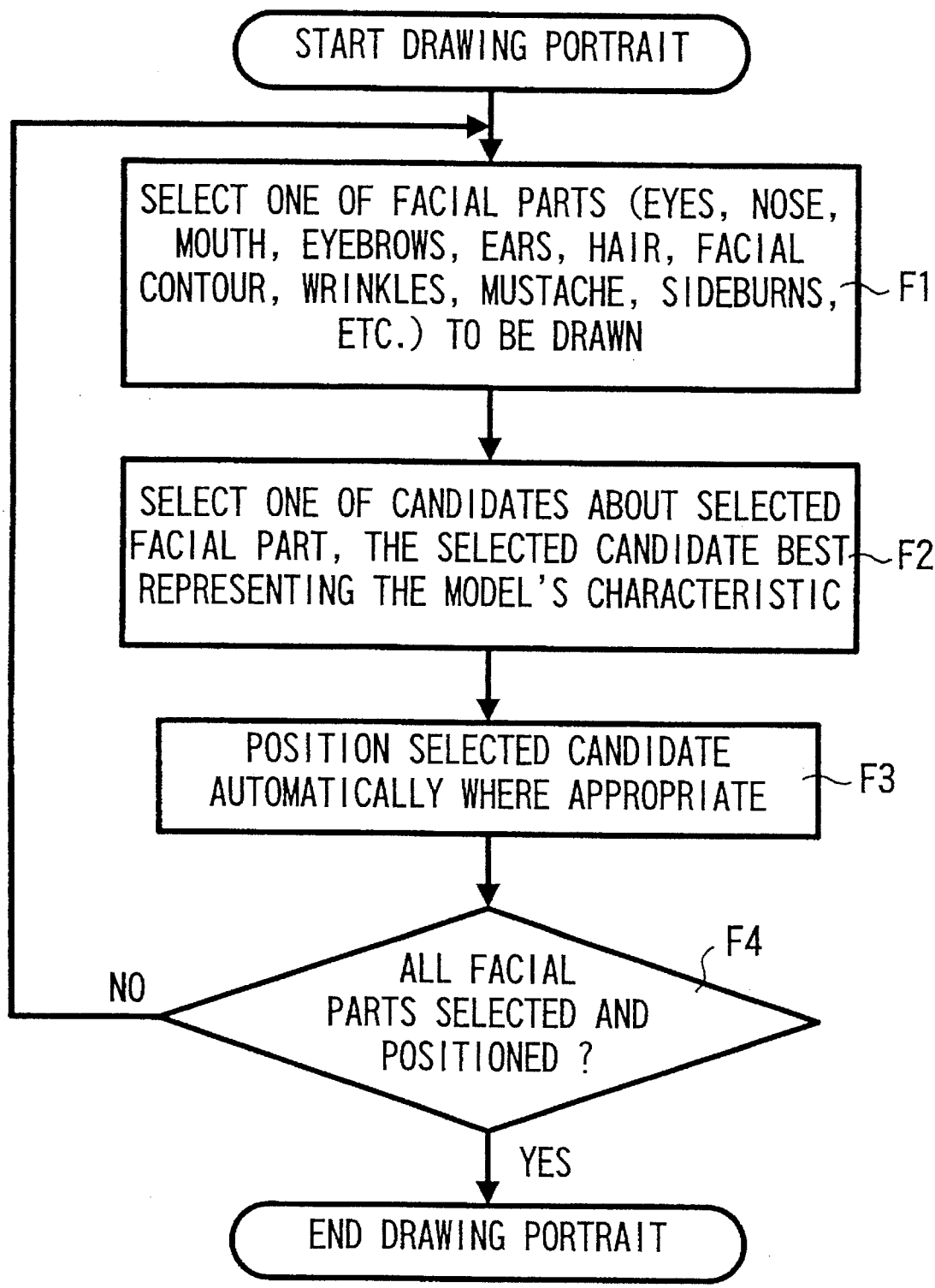
FIG. 4 is a flowchart of steps in which a typical prior art portrait drawing apparatus works.

How a completed portrait is later modified using the embodiment will now be described with reference to the flowchart of FIG. 3. First, the draft image data about the model whose portrait is to be modified are read in by the draft image reader 9 (step S11). The draft image data thus read are transferred to the draft image VRAM 6 (step S12). Since the finished portrait data are already stored in the finished portrait data memory 10, the portrait data about the finished portrait are read therefrom and transferred to the portrait image VRAM 7 (step S13). The CRT controller 11 then takes the applicable data from the draft image VRAM 6 and from the portrait image VRAM 7, combines the data into an image and displays that image on the display unit 4 (step S14).

The operator compares the draft image with the portrait image on the display unit 4, and clicks the mouse 2 on the facial part to be modified in the portrait image (step S15). The data on the selected facial part are retrieved from the facial part data memory 8 and transferred to the portrait image VRAM 7 (step S16). The transferred data are displayed on the display screen 12 in the form of a collection of facial part candidates. As in drawing a portrait, the operator views the draft image and clicks the mouse 2 on the most appropriate facial part candidate that will replace the current facial part (step S17). Moving the mouse 2 displaces the selected candidate correspondingly on the display screen 12. Clicking again the mouse 2 determines the position of the selected facial part candidate (step S18). With the position of the new facial part candidate determined, the selected candidate and its display position are stored in the finished portrait data memory 10 (step S19).

This completes the modification of one facial part. The operator checks to see if there is any other facial part to be modified (step S20). If there exists another facial part that needs to be modified, step S15 is reached again and the modifying process is repeated starting from there. If the modification is judged to be complete in step S20, the modification of the portrait is brought to an end.

Whether the portrait has been drawn anew or modified, the finished portrait image developed in the portrait image VRAM 7 may be output as needed on the printer 5.

As described, the portrait drawing apparatus having image data input function according to the invention allows the operator to select facial part candidates while displaying the draft image of the model to be drawn on the display screen. Comparing the candidates with the draft image makes it easy to select the most appropriate candidate of each facial part as well as to position the selected candidate where appropriate. Using the embodiment of the invention, even novices in the field of portrait drawing can draw portraits of acceptable quality with ease.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A portrait drawing apparatus, comprising:

means for storing image data of desired base face patterns;

display means for displaying a desired base face pattern image;

memory means for storing base pattern data corresponding to a plurality of facial parts;

select means for selecting one of the base pattern data stored in said memory means;

display control means for displaying the base pattern data selected by said select means at a position of a facial part corresponding to the selected base pattern data in the desired face pattern image displayed on said display means; and control means for checking that base pattern data is selected for each of the plurality of facial parts, wherein the display control means automatically superimposes the base pattern data selected by the select means at the position of a facial part corresponding to the selected base pattern data on the desired base face pattern image displayed on the display means.

2. The portrait drawing apparatus as claimed in claim 1, further comprising input means for inputting image data about the desired base face pattern image taken from a picture.

3. The portrait drawing apparatus as claimed in claim 1, wherein said display control means superimposes the base pattern data selected by said select means at the position of a facial part corresponding to the selected base pattern data on the desired base face pattern image displayed on said display means.

4. The portrait drawing apparatus as claimed in claim 2, further comprising a scanner for scanning the picture to create the face pattern image.

5. The portrait drawing apparatus as claimed in claim 4, wherein the picture shows a photograph of a human face.

6. The portrait drawing apparatus as claimed in claim 2, wherein each of said plurality of facial parts has a plurality of permutations.

7. The portrait drawing apparatus as claimed in claim 6, wherein said select means is used for selecting one of the permutations of the base pattern data for each of the plurality of facial parts.

8. A portrait drawing apparatus, comprising:

a first memory for storing image data of a face pattern;

a second memory for storing a plurality of permutations for each of a plurality of facial parts;

a display having two display sections, a first section for displaying the face pattern and a second section for displaying the permutations of a selected facial part;

selection means for designating a facial part for which the permutations are to be displayed and for selecting from among the permutations, the selection means including positioning means for automatically positioning the permutation of a facial part at an appropriate position superimposed on the face pattern;

display control means for displaying the face pattern and the selected permutations of the facial parts superimposed thereon; and control means for checking that a permutation is selected for each of the plurality of facial parts.

9. The portrait drawing apparatus as claimed in claim 8, wherein said selection means further comprises positioning means for positioning the permutation of a facial part at an appropriate position superimposed on the face pattern.

10. The portrait drawing apparatus as claimed in claim 8, further comprising input means for inputting image data about a desired base face pattern taken from a picture.

11. The portrait drawing apparatus as claimed in claim 10, wherein the input means comprises a scanner for scanning the picture to create the face pattern.

12. The portrait drawing apparatus as claimed in claim 11, wherein the picture shows a photograph of a human face.

13. The portrait drawing apparatus as claimed in claim 9, further comprising a portrait memory for storing the selected permutation for each facial part and its position as a portrait image.

14. The portrait drawing apparatus as claimed in claim 13, further comprising print means for printing the portrait image as stored in the portrait memory.

15. A method for creating a portrait, comprising the steps of:

storing a facial image in a first memory;

storing a plurality of permutations of a plurality of facial parts for making up a portrait image in a second memory;

displaying the facial image on a display screen;

selecting a facial part and displaying the permutations of the selected facial part on the display adjacent to the facial image;

selecting one of the permutations of the facial part and positioning it so as to be superimposed upon a corresponding facial part of the facial image;

storing the selected permutation of the facial part when the permutation is determined to match the facial part of the facial image in a third memory;

displaying automatically the facial image and the selected permutation of the facial part superimposed thereon on the display screen;

determining with a control unit whether a permutation has been selected for all facial parts; and printing a copy of a complete portrait image also stored in said third memory.

16. The method as claimed in claim 15, further comprising a step of scanning a picture to create the facial image.

17. The portrait drawing apparatus as claimed in claim 16, wherein the picture shows a photograph of a human face.

18. The method as claimed in claim 15, further comprising the step of modifying the complete portrait image stored in the third memory.

19. The method as claimed in claim 18, wherein said modifying step comprises the steps of:

recalling the complete portrait image from the third memory and displaying the complete portrait image on the display screen;

identifying the facial part to be modified by one of changing the selected permutation, moving the facial part to a new position, and both changing the permutation and moving the facial part;

making a modification; and storing a modified portrait image in the third memory.

20. The method as claimed in claim 19, wherein the facial image is first displayed on said display prior to recalling the complete portrait image from the third memory, said recalled portrait image being superimposed upon the facial image.

21. The method according to claim 15, further comprising a step of displaying the facial image and the selected permutation of the facial part superimposed thereon on the display screen.

* * * * *